US008584080B2

(12) United States Patent
Gery et al.

(10) Patent No.: US 8,584,080 B2
(45) Date of Patent: Nov. 12, 2013

(54) MODELING AND GENERATING COMPUTER SOFTWARE PRODUCT LINE VARIANTS (75) Inventors: Eran Gery, Rehovot (IL); Beery Holstein, Herzliya (IL); Ouri Poupko, Ness Ziona (IL); Alexander Rekhter, Ashdod (IL); Avraham Shalev, Jeruslem (IL); Raz Moshe Yerushalmi, Kfar Warburg (IL)

(73) Assignee: International Business Machines Corporation, Armonk, NY (US)

( * ) Notice: Subject to any disclaimer, the term of this patent is extended or adjusted under 35 U.S.C. 154(b) by 798 days.

(21) Appl. No.: 12/728,791

(22) Filed: Mar. 22, 2010

(65) Prior Publication Data

US 2011/0231178 A1 Sep. 22, 2011

(51) Int. Cl.
G06F 9/44 (2006.01)
G06F 9/45 (2006.01)

(52) U.S. Cl.
USPC .............................. 717/104; 717/105; 703/22

(58) Field of Classification Search
None
See application file for complete search history.

(56) References Cited

U.S. PATENT DOCUMENTS

| | | | | |
|---|---|---|---|---|
| 7,089,534 | B2 * | 8/2006 | Hartman et al. | 717/125 |
| 7,117,484 | B2 * | 10/2006 | Hartman et al. | 717/126 |
| 7,543,269 | B2 * | 6/2009 | Krueger et al. | 717/107 |
| 8,156,470 | B2 * | 4/2012 | Krueger et al. | 717/107 |
| 2005/0071806 | A1 | 3/2005 | Sreedhar | |
| 2005/0096037 | A1 * | 5/2005 | Haberman et al. | 455/422.1 |
| 2005/0267889 | A1 | 12/2005 | Snyder et al. | |
| 2006/0129418 | A1 * | 6/2006 | Lee et al. | 705/1 |
| 2006/0136864 | A1 * | 6/2006 | Choi et al. | 717/104 |
| 2007/0180424 | A1 * | 8/2007 | Kazakov et al. | 717/104 |
| 2007/0209031 | A1 * | 9/2007 | Ortal et al. | 717/104 |
| 2007/0283318 | A1 * | 12/2007 | Tong et al. | 717/104 |
| 2008/0077547 | A1 * | 3/2008 | Thurimella | 706/46 |
| 2008/0162212 | A1 * | 7/2008 | Clayton et al. | 705/7 |
| 2008/0215393 | A1 * | 9/2008 | Bruegge et al. | 705/7 |
| 2008/0249646 | A1 | 10/2008 | Alse | |
| 2008/0250389 | A1 | 10/2008 | Hinchey et al. | |

(Continued)

FOREIGN PATENT DOCUMENTS

WO 2007001108 1/2007

OTHER PUBLICATIONS

Diaz-Herrera et al, "Aspect-Oriented UML Modeling for Developing Embedded Systems product lines," SPSU, Jan. 31, 2000.*

(Continued)

*Primary Examiner* — Henry Tsai
*Assistant Examiner* — Jing-Yih Shyu
(74) *Attorney, Agent, or Firm* — Holland & Knight LLP; Brian J. Colandreo, Esq.; Jeffrey T. Placker, Esq.

(57) ABSTRACT

A system for modeling computer software product line variants may include a model builder configured to construct a model of a plurality of variants of a computer software application. The model may include at least one common-to-variants element that may be common to a plurality of the variants, a plurality of variant-specific elements, and interface code configured to adapt any of the variant-specific elements to any of the common-to-variants elements. The model may further include an application generator configured to generate a plurality of computer software applications for a corresponding plurality of combinations of the common-to-variants elements and the variant-specific elements, where the model builder and the application generator may be implemented in at least one of computer hardware and computer software embodied in a tangible computer-readable storage medium.

13 Claims, 11 Drawing Sheets (56) References Cited

U.S. PATENT DOCUMENTS

2008/0282220 A1* 11/2008 Krueger et al. ............... 717/104
2009/0089738 A1   4/2009 Krueger et al.
2009/0235227 A1*  9/2009 Hartman et al. ............. 717/104

OTHER PUBLICATIONS

Riebisch et al., "Modeling Variability for Object-Oriented Product Lines," Springer Berlin/Heidelberg, Jun. 8, 2004.*
Myllymaki, "Variability Management in Software Product Lines," TUT, Mar. 12, 2001.*
Zhang et al., "XVCL: a mechanism for handling variants in software product lines," Jul. 24, 2004.*
"Software Variability Management Workshop", Feb. 13 & 14, 2003 Jilles Van Gurp & jan Bosch, Feb. 2003.*
Robak et al., "Extending the UML for Modelling Variability for System Families," AMCS, 2002.*
Trigaux et al., "Software Product Lines: State of the art," Sep. 15, 2003.*
Ziadi et al., "Product Line Derivation with UML," 2003.*
Ziadi et al., "Towards a UML profile for software product lines," 2003.*
"Cardinality-Based Feature Modeling and Model-Driven Engineering: Fitting them Together" by Abel Gómez and Isidro Ramos.*
"Cardinality-dependent Variability in Orthogonal Variability Models" by Hans Martin Mærsk-Møller and Bo Nørregaard Jørgensen.*
Mike Mannion, "Using First-Order Logic for Product Line Model Validation", SPLC2 2002, LNCS 2379, p. 176-187,2002.*
"Modeling and Simulating a Software Architecture Design Space" by Charles W. Krueger, Ph. D Thesis, Carnegie Mellon University, Dec. 1997.*
"Software Product Line Reuse in Practice" by Charles W. Krueger, 2000 IEEE.*
"The Design and Implementation of Hierarchical Software Systems with Reusable Components" by Don Batory and Sean O'Malley, ACM Transactions on Software Engineering and Methodology. vol. 1. No. 4, Oct. 1992.*
Edson Alves de Oliveira Junior et al., "Adding Variability Management to UML-based Software Product Lines," Oct. 2005, School of Computer Science, University of Waterloo, Waterloo, Canada.
Webber, Diana L. et al., "Modeling Variability in Software Product Lines with the Variation Point Model," Science of Computer Programming, v 53, n 3, p. 305-331, Dec. 2004.

* cited by examiner

Fig. 2

```
/***********************************************************************
        Rhapsody       : 7.5.1
        Login          : ouripoup
        Component      : DefaultComponent
        Configuration  : DefaultConfig
        Model Element  : ControllerInterface_CPPClass
//!     Generated Date : Wed, 20, Jan 2010
        File Path      :
DefaultComponent\DefaultConfig\ControllerInterface_CPPClass.h
***********************************************************************/ ifndef ControllerInterface_CPPClass_H
define ControllerInterface_CPPClass_H

//## class ControllerInterface_CPPClass
#include "VendorA_Controller_CPPClass.h"
//#[ ignore
//## package Default //## ignore
ifndef ControllerInterface_CPPClass_defined
#define ControllerInterface_CPPClass_defined
typedef VendorA_Controller_CPPClass ControllerInterface_CPPClass;
endif //## package Default //## ignore
//#]

#endif
/***********************************************************************
        File Path      :
DefaultComponent\DefaultConfig\ControllerInterface_CPPClass.h
***********************************************************************/
```

Fig. 3A

```
#ifndef VendorA_Controller_CPPClass_H
#define VendorA_Controller_CPPClass_H

//## auto_generated
#include <oxf\oxf.h>
//## package Default

//## class VendorA_Controller_CPPClass
class VendorA_Controller_CPPClass {
    ////    Constructors and destructors    //// public :

//## auto_generated
    VendorA_Controller_CPPClass();

//## auto_generated
    ~VendorA_Controller_CPPClass();

////    Operations    ////

//#[ ignore
    void oper();
//#]

////    Additional operations    ////

//## auto_generated
    int getAttr() const;

//## auto_generated
    void setAttr(int p_attr);

////    Attributes    //// protected :

//#[ ignore
    int attr;
//#]
};

#endif
```

Fig. 3B

```
#ifndef ControllerInterface_CFile_H
#define ControllerInterface_CFile_H

/*## class ControllerInterface_CFile */
#include "VendorA_Controller_CFile.h"
/*## package Default */

/*## class TopLevel::ControllerInterface_CFile */

/*## package Default */

/*## class TopLevel::ControllerInterface_CFile */ endif
```

Fig. 4A

```
#ifndef VendorA_Controller_CFile_H
#define VendorA_Controller_CFile_H

/*## auto_generated */
#include <oxf\Ric.h>
/*## package Default */

/*## class TopLevel::VendorA_Controller_CFile */
/*#[ ignore */
extern int attr;
/*#]*/

/*    User explicit entries    */

/* Operations */

/*#[ ignore */
void oper(void);
/*#]*/

/*    User explicit entries    */ endif
```

Fig. 4B

```
#ifndef ControllerInterface_CClass_H
#define ControllerInterface_CClass_H

/*## class ControllerInterface_CClass */
#include "VendorA_Controller_CClass.h"
/*#[ ignore */
/*## package Default */

/*## ignore */
#ifndef struct_ControllerInterface_CClass_defined
#define struct_ControllerInterface_CClass_defined
typedef struct VendorA_Controller_CClass ControllerInterface_CClass;
endif /*    User implicit entries    */

/* Constructors and destructors:*/

/*## auto_generated */
#define ControllerInterface_CClass_Init(me)     \
    VendorA_Controller_CClass_Init(me)

/*## auto_generated */
#define ControllerInterface_CClass_Cleanup(me)     \
    VendorA_Controller_CClass_Cleanup(me)

/***    User explicit entries    ***/

/* Operations */

/*## operation oper() */
#define ControllerInterface_CClass_oper(me)     \
    VendorA_Controller_CClass_oper(me)

/*## auto_generated */
#define ControllerInterface_CClass_Create()     \
    VendorA_Controller_CClass_Create()

/*## auto_generated */
#define ControllerInterface_CClass_Destroy(me)     \
    VendorA_Controller_CClass_Destroy(me)

/*## package Default */

/*## ignore */
/*#]*/ endif
```

Fig. 5A

```
#ifndef VendorA_Controller_CClass_H
#define VendorA_Controller_CClass_H

/*## auto_generated */
#include <oxf\Ric.h>
/*## package Default */

/*## class VendorA_Controller_CClass */
typedef struct VendorA_Controller_CClass VendorA_Controller_CClass;
struct VendorA_Controller_CClass {
    /*#[ ignore */
    int attr;
    /*#]*/
};

/***    User implicit entries    ***/

/* Constructors and destructors:*/

/*## auto_generated */
void VendorA_Controller_CClass_Init(VendorA_Controller_CClass* const me);

/*## auto_generated */
void VendorA_Controller_CClass_Cleanup(VendorA_Controller_CClass* const me);

/***    User explicit entries    ***/

/* Operations */

/*#[ ignore */
void VendorA_Controller_CClass_oper(VendorA_Controller_CClass* const me);
/*#]*/

/*## auto_generated */
VendorA_Controller_CClass * VendorA_Controller_CClass_Create(void);

/*## auto_generated */
void VendorA_Controller_CClass_Destroy(VendorA_Controller_CClass* const me);

#endif
```

MODELING AND GENERATING COMPUTER SOFTWARE PRODUCT LINE VARIANTS

BACKGROUND OF THE INVENTION

The present disclosure relates generally to tools and techniques for modeling and generating computer software applications, and more particularly to modeling and generating variants thereof.

Computer software applications may be developed as variations of a base application that may correspond to distinct product lines in a product family. As application developers may become increasingly dependent on modeling tools that may support modeling computer software applications using paradigms such as the Unified Modeling Language (UML), as well as tools that may generate source code or executable code from such models, there may be a need to define product lines and their variations in a single model, and to do so in a way that may support the generation of code for each distinct product line.

SUMMARY OF THE INVENTION

In one aspect of the disclosure a system may be provided for modeling computer software product line variants. The system may include a model builder configured to construct a model of a plurality of variants of a computer software application, where the model may include at least one common-to-variants element that may be common to a plurality of the variants, a plurality of variant-specific elements, and interface code that may be configured to adapt any of the variant-specific elements to any of the common-to-variants elements, and an application generator configured that may generate a plurality of computer software applications for a corresponding plurality of combinations of the common-to-variants elements and the variant-specific elements, where the model builder and the application generator may be implemented in at least one of computer hardware and computer software embodied in a tangible computer-readable storage medium.

In another aspect of the disclosure a method may be provided for modeling computer software product line variants. The method may include constructing a model of a plurality of variants of a computer software application, where the model may include at least one common-to-variants element that may be common to a plurality of the variants, a plurality of variant-specific elements, and interface code that may be configured to adapt any of the variant-specific elements to any of the common-to-variants elements, and may generate a plurality of computer software applications for a corresponding plurality of combinations of the common-to-variants elements and the variant-specific elements. A computer program product for modeling computer software product line variants may also be provided.

DETAILED DESCRIPTION OF THE INVENTION

This disclosure may now be described within the context of one or more embodiments. Although the description may be illustrative of the invention as a whole, it is not intended to be construed as limiting the invention to the embodiments shown. It may be appreciated that various modifications may occur to those skilled in the art that, while not specifically shown herein, are intended to be within the true spirit and scope of the invention.

As may be appreciated by one skilled in the art, aspects of the present disclosure may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
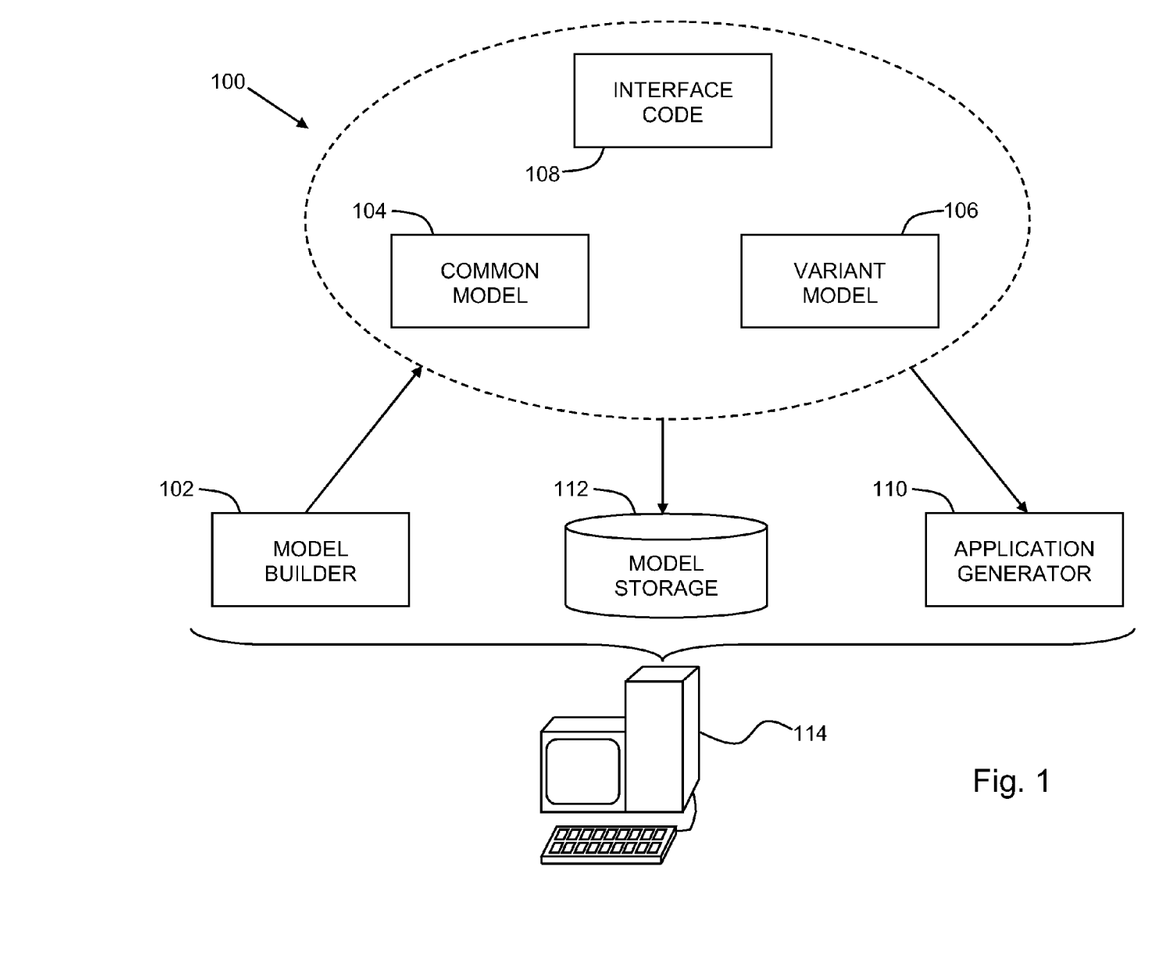
FIG. 1 is a simplified conceptual illustration of system for modeling and generating computer software product line variants, constructed and operative in accordance with an embodiment of the present invention.

Reference is now made to FIG. 1 which may be a simplified conceptual illustration of system for modeling and generating computer software product line variants, constructed and operative in accordance with an embodiment of the present invention. In the system of FIG. 1, a model, generally designated 100 may be shown bounded by dashed lines, where model 100 may model multiple variants of a computer software product line. Model 100 may be typically constructed using a model builder 102 which may employ any known modeling technology, such as the Unified Modeling Language (UML), that may support classes and associations between the classes. Model 100 may be logically divided into a common model 104 of elements that may be common to some or all variants, also referred to herein as "common-to-variants" elements, a variant model 106 of elements specific to individual variants, also referred to herein as "variant-specific" elements, and interface code 108 that may adapt variant model 106 to common model 104. An application generator 110 may be configured in accordance with conventional techniques to generate computer software applications in the form of interpretable, compilable, and/or executable computer software from model 100, and may generate different computer software applications for different variants of model 100 as represented by variant model 106.

Model 100 may be stored in a model storage 112, which may be computer memory, magnetic storage, or any other suitable information storage medium. Model 100 may be stored in storage 112 in any suitable format, such as in a relational database (RDB) or object-oriented database (OODB). Any of the elements shown in FIG. 1 may be executed by or otherwise accessible to a computer 114.

Figure 2:
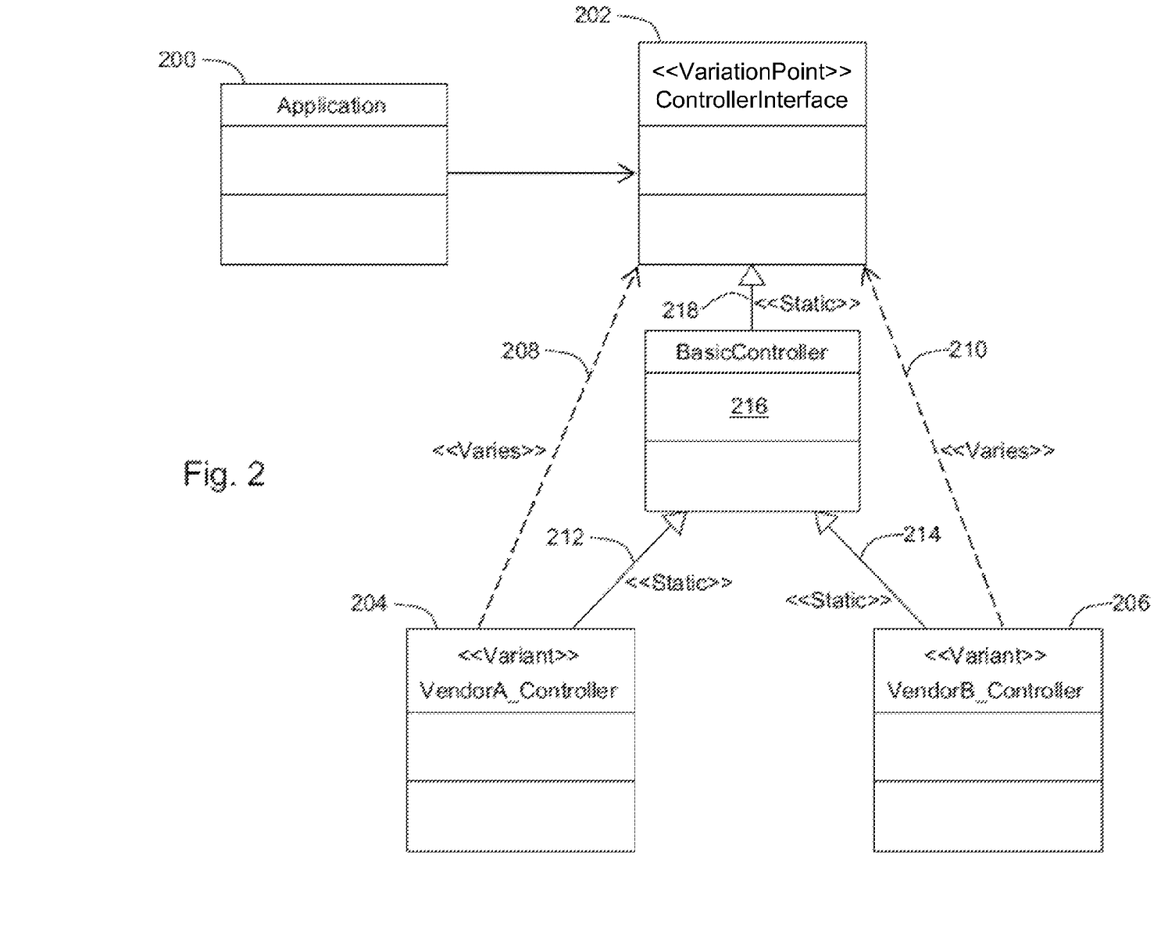
FIG. 2 is an implementation of a model of multiple variants of a computer software product line, constructed and operative in accordance with an embodiment of the present invention.

Reference is now made to FIG. 2, which may be an implementation of a model of multiple variants of a computer software product line, and may be constructed and operative in accordance with an embodiment of the present invention. In the model shown in FIG. 2, which may represent an implementation of model 100 of FIG. 1, common elements of a computer software product line may be logically represented by a class 200 labeled "Application." Two variants of an automobile controller interface may be modeled by creating a place-holder class, such as place-holder class 202 labeled "ControllerInterface," as well as a variant class for each individual variant, such as variant classes 204 and 206 labeled "VendorA_Controller" and "VendorB_Controller" respectively. Place-holder class 202 may be assigned the stereotype <<VariationPoint>>, while variant classes 204 and 206 may each be assigned the stereotype <<Variant>>. Place-holder class 202 may not have an associated .c or .cpp file. Dependency relationships 208 and 210 may be created between place-holder class 202 and variant classes 204 and 206 and may be assigned the stereotype <<Varies>>.

Inheritance may be modeled for variant classes 204 and 206, such as by modeling inheritance relationships directly between variant classes 204 and 206 and place-holder class 202, or by modeling inheritance relationships between variant classes 204 and 206 and one or more other classes, such as by providing inheritance relationships 212 and 214 from a class 216 labeled "BasicController," which itself may have an inheritance relationships 218 with place-holder class 202. In the example shown inheritance relationships 212, 214, and 218 may be labeled with the <<Static>> (also referred to as "static") stereotype which may serve as an alternative method for inheritance in structural languages such as C and may be complementary to the use of place-holder classes acting as variation points as described herein, and may ensure that a variation point may be replaceable by its variants. Static inheritance may ensure that a statically-derived variant may adhere to the same interface as the variation point and also may allow for other features to be transferred from the variation point to its variant, such as relations to other elements. Static inheritance may be implemented during code generation, such as by application generator 110 (FIG. 1), by duplicating all features of the 'Static' base class into the 'Static' derived class.

Figure 3A:
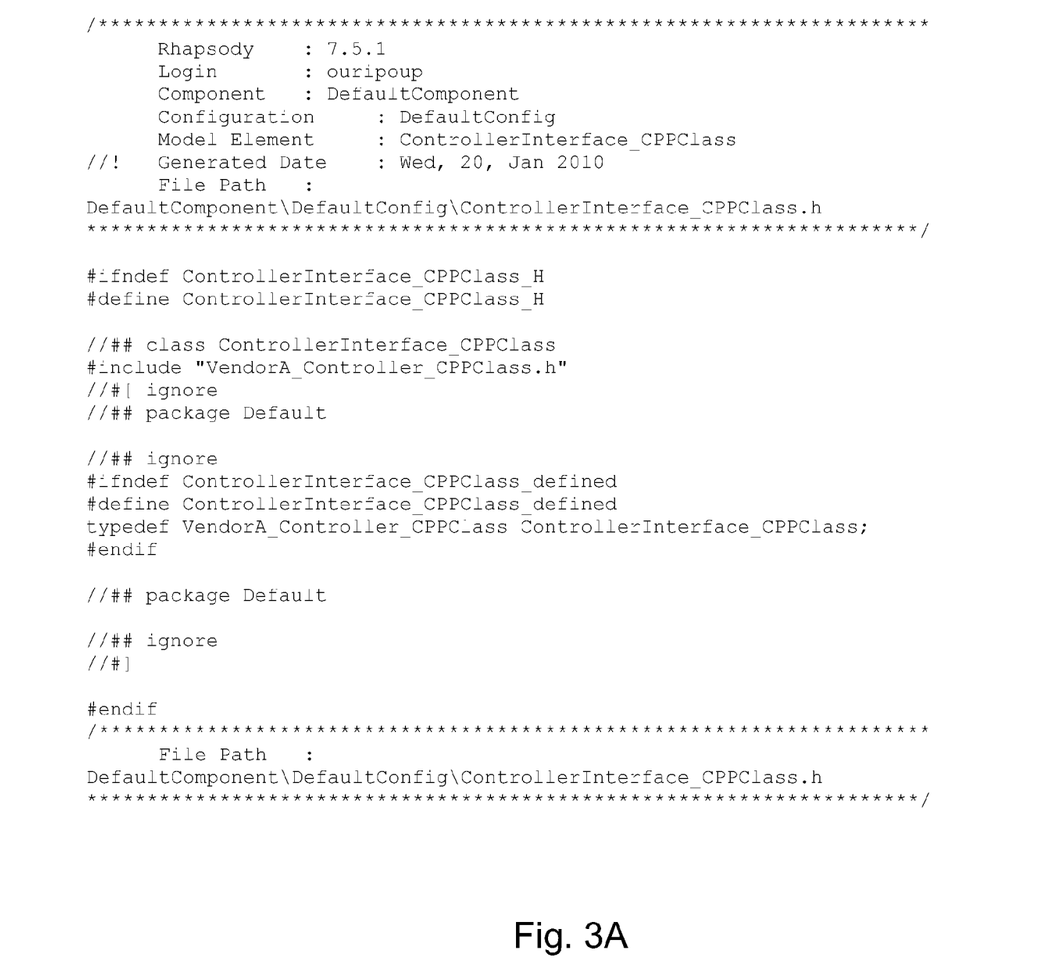
FIGS. 3A, 4A, and 5A are .h files of implementations of interface elements of the ControllerInterface of FIG. 2, constructed and operative in accordance with an embodiment of the present invention.
Figure 3B:
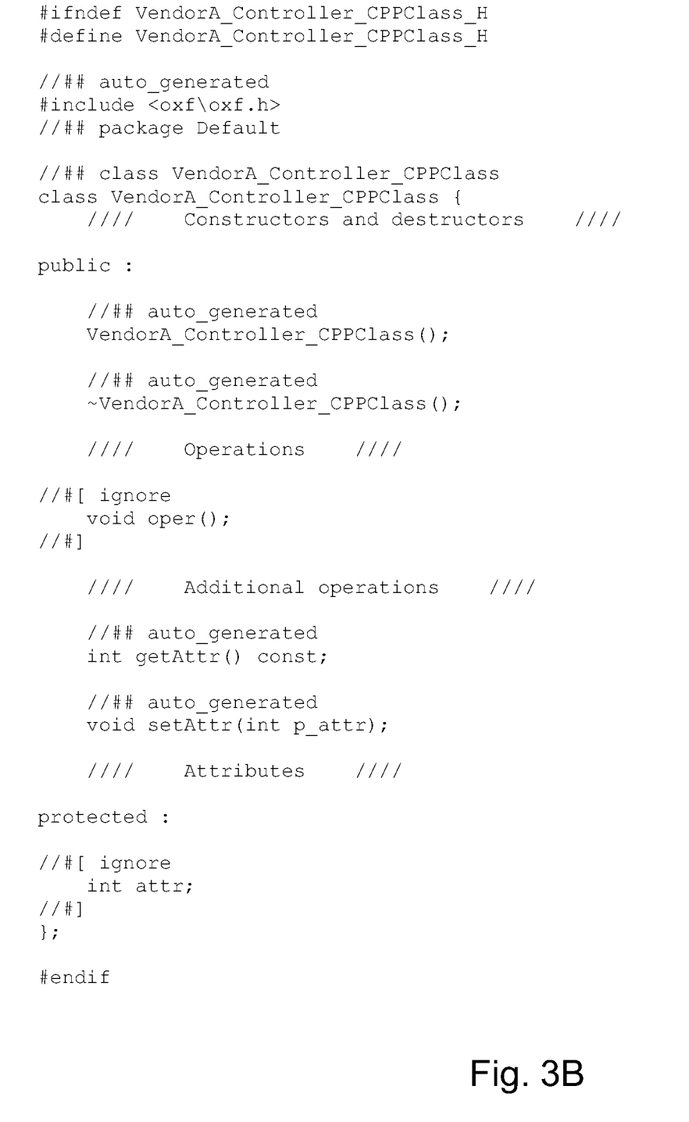
FIGS. 3B, 4B, and 5B are .h files of implementations of interface elements of the VendorA_Controller of FIG. 2, constructed and operative in accordance with an embodiment of the present invention.
Figure 4A:
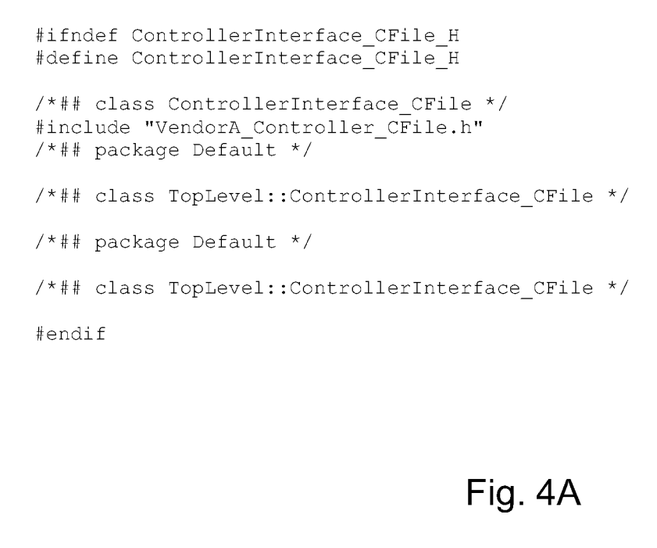
Figure 4B:
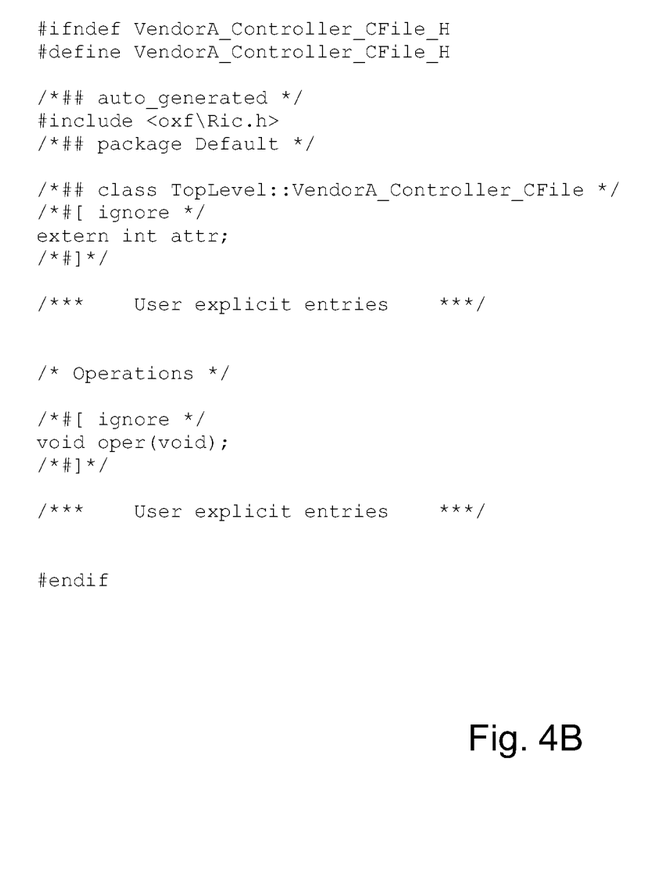
Figure 5A:
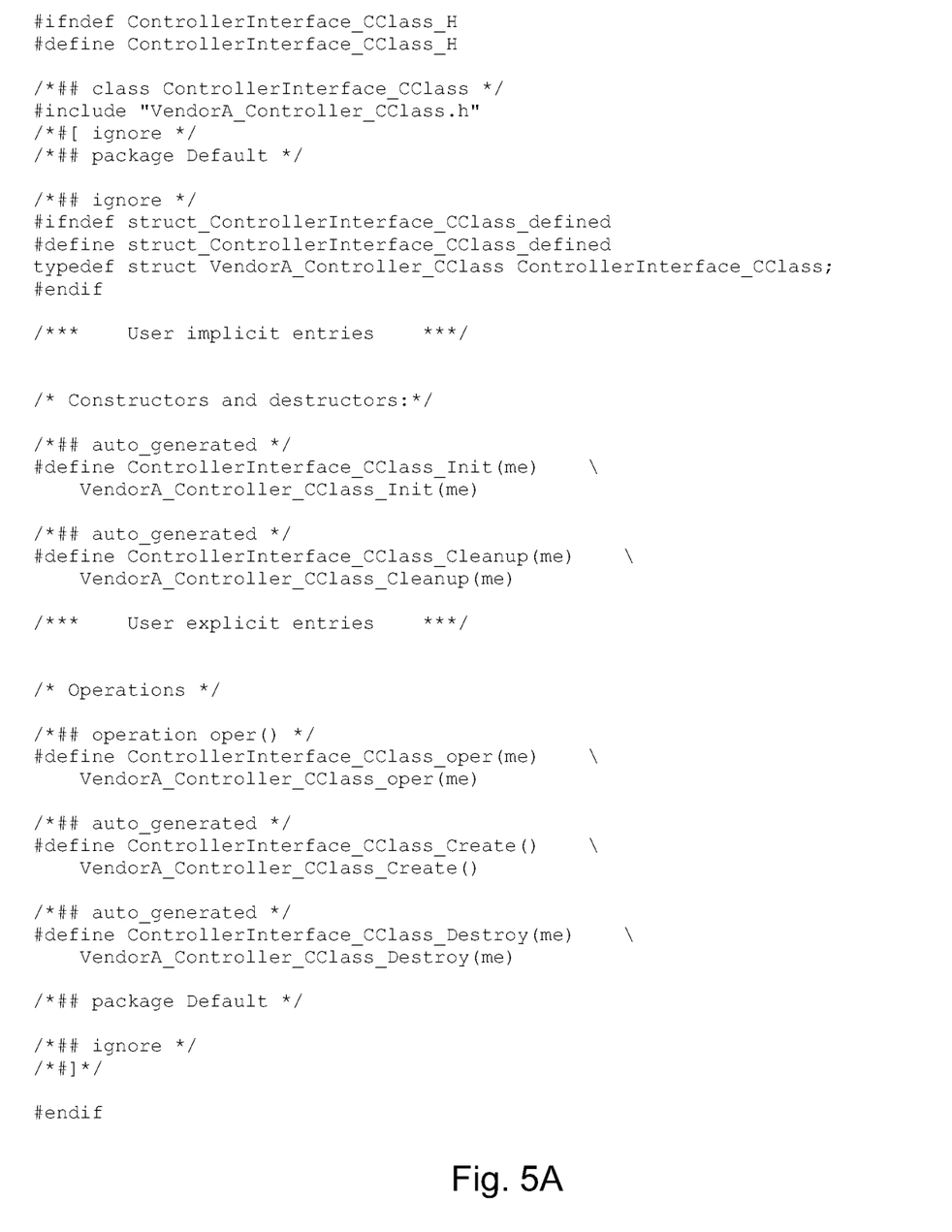
Figure 5B:
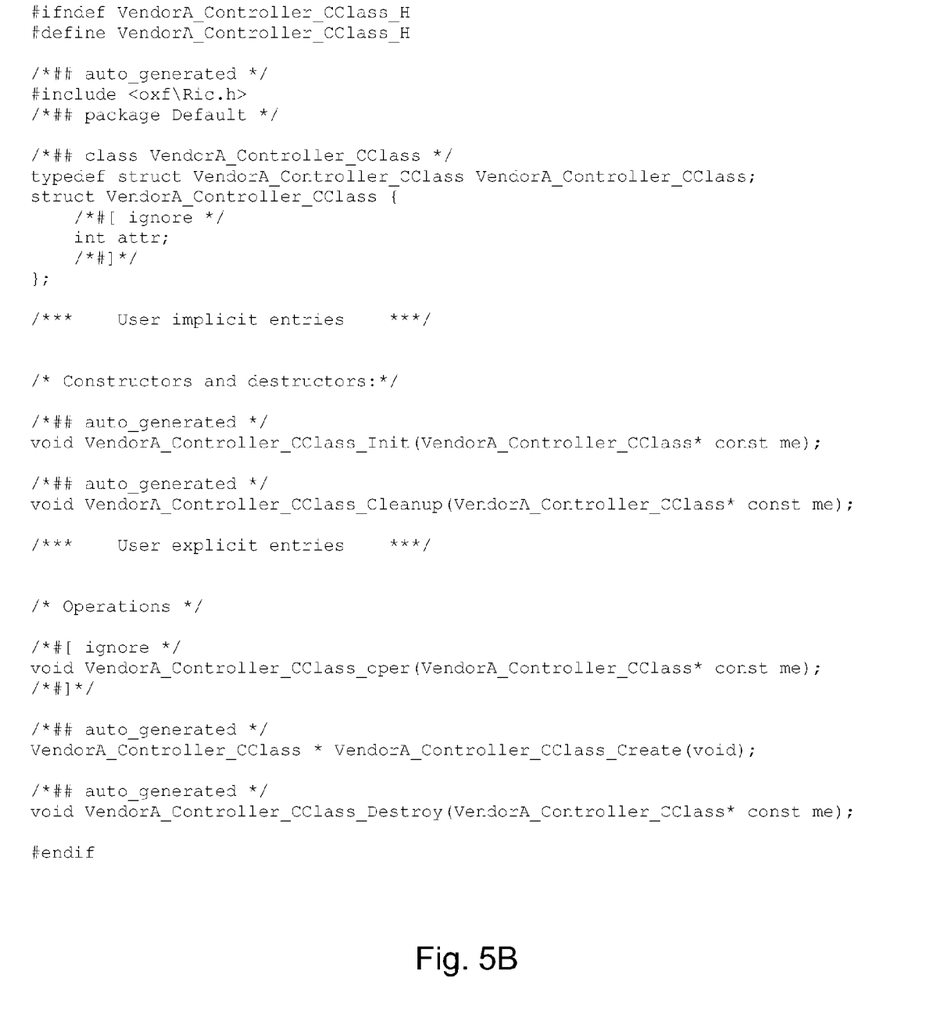

Reference is now made to FIGS. 3A, 4A, and 5A, which may be .h files of implementations of interface elements of the ControllerInterface of FIG. 2, and to FIGS. 3B, 4B, and 5B, which may be .h files of implementations of interface elements of the VendorA_Controller of FIG. 2, and may be constructed and operative in accordance with an embodiment of the present invention. .h files as referred to herein may be understood to represent computer programming language-based descriptions of software interfaces. FIGS. 3A, 3B, 4A, 4B, 5A, and 5B may be, for illustration purposes, specifically adapted to IBM® Rational® Rhapsody, commercially available from International Business Machines, Armonk, N.Y., and may illustrate the invention with respect to the VendorA_Controller variant for which an application may be generated, although their applicability for any variant may be readily appreciated. To generate variant applications modeled in a single model as described herein, a variant class may be generated as a regular class, and C/C++ typedef constructs may be used to define the name of the variation point as an alternative name to the same variant class. In this approach both the variation point and the variant may remain known artifacts in the generated code. Computer instructions may not be generated for the ControllerInterface class itself which, as such, may have no existence in the generated application beyond the type definitions described herein. Computer instructions may be generated for VendorA_Controller class, with the addition of statically inherited features where applicable.

FIGS. 3A and 3B may be adapted for a C++ implementation, where FIG. 3A may includes the following code:

```
#include "VendorA_Controller.h"
typedef VendorA_Controller ControllerInterface;
```

FIGS. 4A and 4B may be adapted for use with modeling and application generation environments that may support file elements, such as in IBM® Rational® Rhapsody where a file may be a collection of functions and variables packaged together in a single code source file. Thus, where the elements shown in FIG. 2 may be files instead of classes, the following code may be added to the ControllerInterface.h file as shown in FIG. 4A:

```
#include "VendorA_Controller_CFile.h"
```

FIGS. 5A and 5B are adapted for a C implementation, where additional macro definitions may be required to map between variation points and their variants. Thus, for example, class operations may be implemented in IBM® Rational® Rhapsody as C global functions with name mangling. Assuming ControllerInterface has an operation called "foo," it may be implemented as follows as shown in FIG. 5B:

```
void Controllerinterface_foo(Controllerinterface* const me);
```

To ensure that when the application calls "foo" it actually calls VendorA_Controller_foo, the following may be added to ControllerInterface.h:

```
#define Controllerinterface_foo(me) \
    VendorA_Controller_foo(me)
```

Figure 6A:
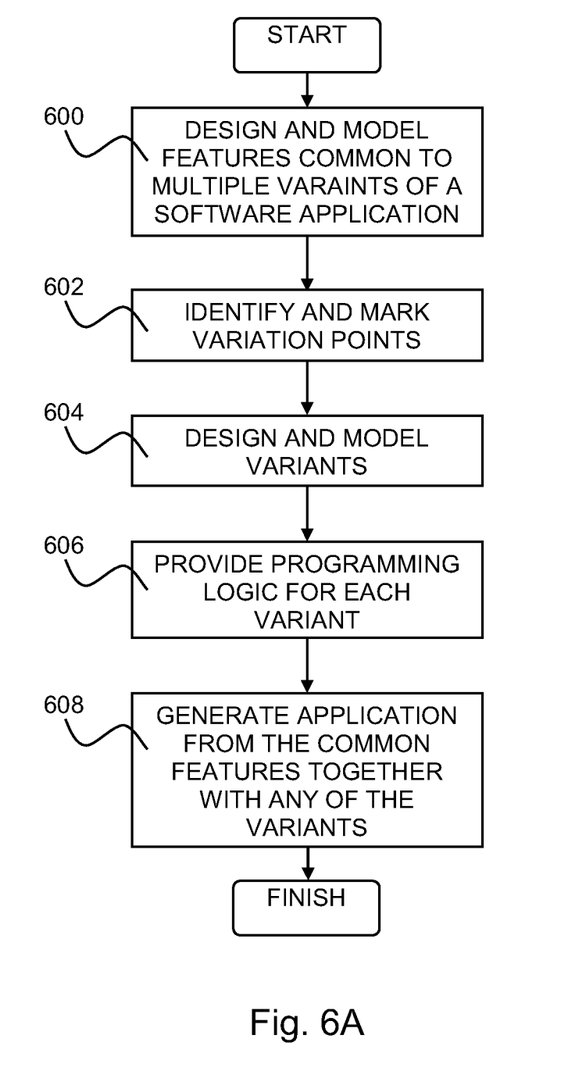
FIGS. 6A and 6B are simplified flowchart illustrations of methods of operation of the system of FIG. 1, operative in accordance with an embodiment of the invention.

Reference is now made to FIG. 6A, which may be a simplified flowchart illustration of a method of operation of the system of FIG. 1, and may be operative in accordance with an embodiment of the invention. In the method of FIG. 6A, features that may be common to multiple variants of a software application may be designed and modeled (600). One or more variation points within the model may be identified and marked as such within the model (602). Each variant of a variation point may be designed and modeled (604). The programming logic for each variant may be provided in association with the variation point and the variant (606). An application may be generated incorporating the common features together with any of the variants (608), such as where separate applications may be generated for each of the variants, or where a user may indicate a selection of one or more of the variants for generation as one or more corresponding applications.

Figure 6B:
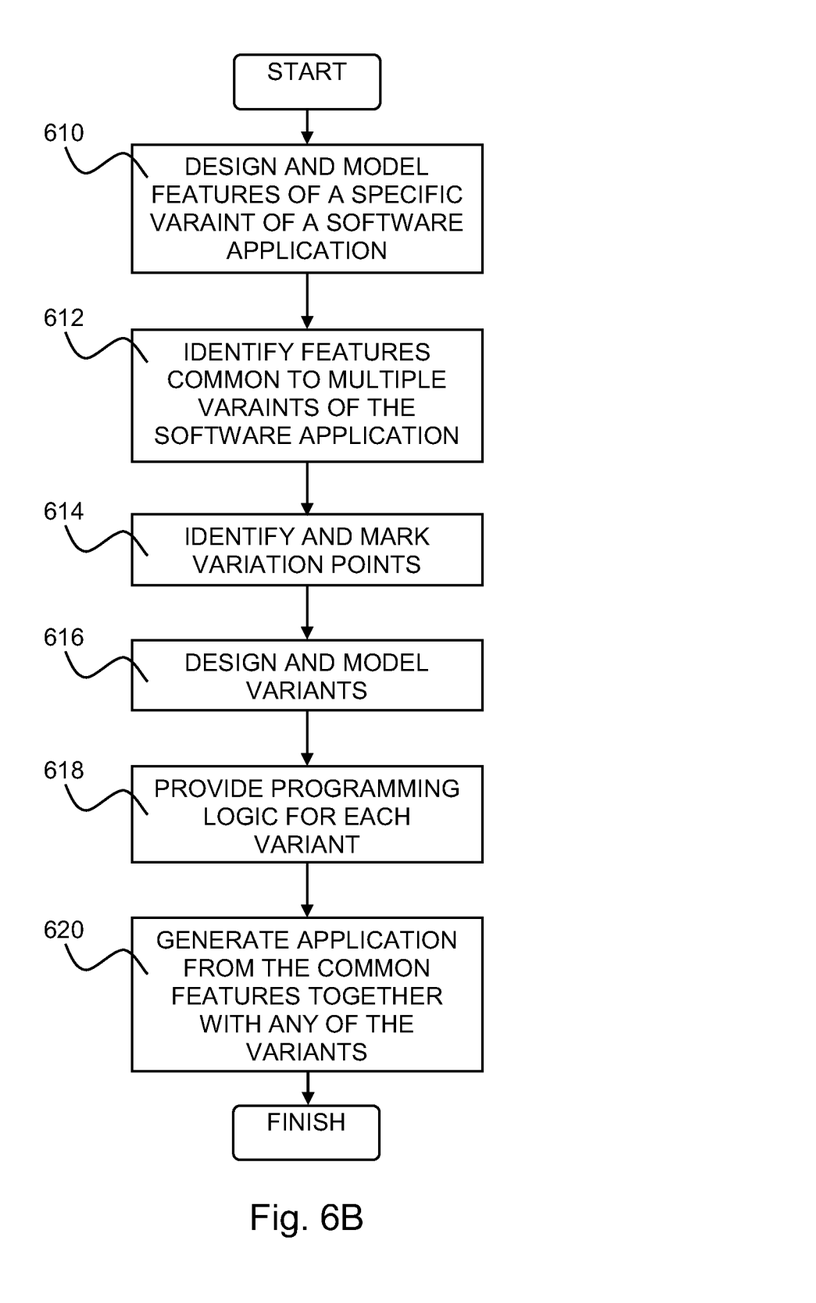

Reference is now made to FIG. 6B, which may be a simplified flowchart illustration of an alternative method of operation of the system of FIG. 1, and may be operative in accordance with an embodiment of the invention. In the method of FIG. 6B, the features of a specific variant of a software application may be designed and modeled (610). Features that may be common to multiple variants of the software application may be identified (612). One or more variation points within the model may be identified and marked as such within the model (614). Each variant of a variation point may be designed and modeled (616). The programming logic for each variant may be provided in association with the variation point and the variant (618). An application may be generated incorporating the common features together with any of the variants (620), such as where separate applications may be generated for each of the variants, or where a user may indicate a selection of one or more of the variants for generation as one or more corresponding applications.

Although the invention has been described by way of example with reference to modeling and generating computer software product line variants, it may be appreciated that the invention may be used to model variants of any type of system to which modeling methodologies are applicable, whether or not such systems may be used as the basis for generating computer software applications.

Figure 7:
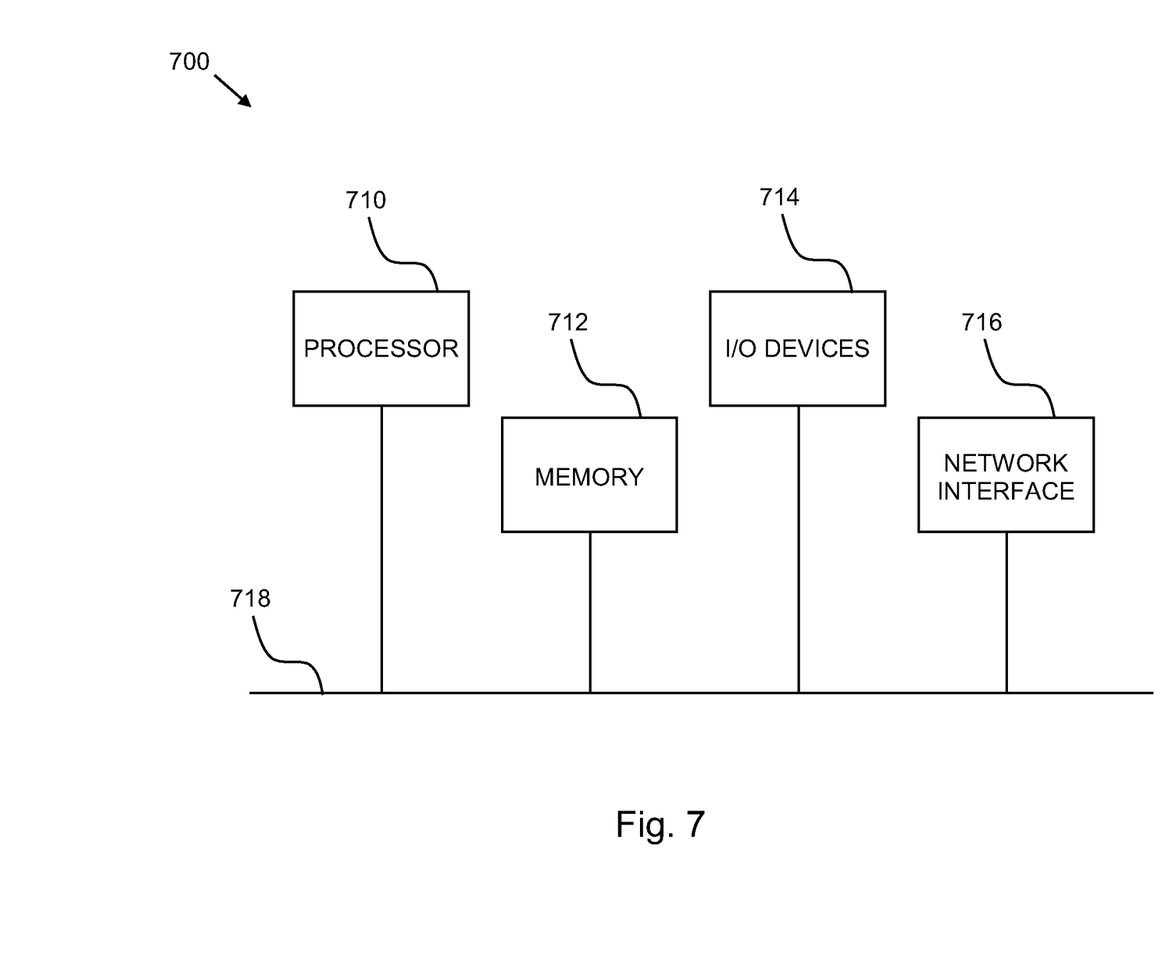
FIG. 7 is a simplified block diagram illustration of a hardware implementation of a computing system, constructed and operative in accordance with an embodiment of the invention.

Referring now to FIG. 7, block diagram 700 may illustrate a hardware implementation of a computing system in accordance with which one or more components/methodologies of the invention (e.g., components/methodologies described in the context of the drawing figures shown and described herein) may be implemented, according to an embodiment of the invention.

As shown, the techniques for controlling access to at least one resource may be implemented in accordance with a processor 710, a memory 712, I/O devices 714, and a network interface 716, coupled via a computer bus 718 or alternate connection arrangement.

It may be appreciated that the term "processor" as used herein may be intended to include any processing device, such as, for example, one that includes a CPU (central processing unit) and/or other processing circuitry. It may also be understood that the term "processor" may refer to more than one processing device and that various elements associated with a processing device may be shared by other processing devices.

The term "memory" as used herein may include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein may include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It may also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it may be appreciated that the methods and apparatus described herein may be readily implemented in computer hardware or software using conventional techniques.

While the invention may have been described with reference to one or more specific embodiments, the description may be illustrative of the invention as a whole and may not be construed as limiting the invention to the embodiments shown. It may be appreciated that various modifications may occur to those skilled in the art that, while not specifically shown herein, and are intended to be within the true spirit and scope of the invention.

What is claimed is:

1. A system for modeling computer software product line variants, the system comprising:
   a model builder configured to construct a model of a plurality of variants of a computer software application, wherein said model includes:
      at least one common-to-variants element that is common to a plurality of said variants;
      a plurality of variant-specific elements, wherein said plurality of variant-specific elements include at least one place-holder class having a first variant-related stereotype and a plurality of dependency associations associating said place-holder class with a plurality of variant classes having a second variant-related stereotype that is different than said first variant-related stereotype, wherein programming logic for each of said plurality of variant-specific elements is provided with each of said plurality of said variants of a variation point, and
      interface code configured to conform any of said variant-specific elements to any of said common-to-variants elements; and
   an application generator configured to generate a plurality of computer software applications for a corresponding plurality of combinations of said common-to-variants elements and said variant-specific elements, wherein said plurality of computer software applications are generated from a single model;
   wherein said model builder and said application generator are implemented in at least one of computer hardware and computer software embodied in a tangible non-transitory computer-readable storage medium.

2. The system of claim 1 wherein said model builder is configured to construct said model employing a modeling methodology that supports classes and associations between classes.

3. The system of claim 1 wherein said model builder is configured to construct said model wherein said variant-specific elements include at least one inheritance association between any of said variant classes and said place-holder class.

4. The system of claim 1 wherein said model builder is configured to construct said model wherein said variant-specific elements include at least one inheritance association between any of said variant classes and at least one other class that itself has an inheritance association with said place-holder class.

5. The system of claim 1 wherein said model builder is configured to construct said model wherein said variant-specific elements include at least one inheritance association having a static stereotype.

6. The system of claim 1 wherein said model builder is configured to construct said model defining a name of said place-holder class as an alternative name to any of said variant classes with which said place-holder class is associated.

7. A method for modeling computer software product line variants, the method comprising:
   constructing a model of a plurality of variants of a computer software application, wherein said model includes:
      at least one common-to-variants element that is common to a plurality of said variants;
      a plurality of variant-specific elements, wherein said plurality of variant-specific elements include at least one place-holder class having a first variant-related stereotype and a plurality of dependency associations associating said place-holder class with a plurality of variant classes having a second variant-related stereotype that is different than said first variant-related stereotype, wherein programming logic for each of said plurality of variant-specific elements is provided with each of said plurality of said variants of a variation point; and
      interface code configured to conform any of said variant-specific elements to any of said common-to-variants elements; and
   generating a plurality of computer software applications for a corresponding plurality of combinations of said common-to-variants elements and said variant-specific elements, wherein said plurality of computer software applications are generated from a single model;
   wherein said constructing and generating are implemented in at least one of computer hardware and computer software embodied in a tangible non-transitory computer-readable storage medium.

8. The method of claim 7 wherein said constructing further comprises constructing said model employing a modeling methodology that supports classes and associations between classes.

9. The method of claim 5 wherein said constructing further comprises constructing said model wherein said variant-specific elements include at least one inheritance association between any of said variant classes and said place-holder class.

10. The method of claim 5 wherein said constructing further comprises constructing said model wherein said variant-specific elements include at least one inheritance association between any of said variant classes and at least one other class that itself has an inheritance association with said place-holder class.

11. The method of claim 5 wherein said constructing further comprises constructing said model wherein said variant-specific elements include at least one inheritance association having a static stereotype.

12. The method of claim 5 wherein said constructing further comprises constructing said model defining a name of said place-holder class as an alternative name to any of said variant classes with which said place-holder class is associated.

13. A computer program product for modeling computer software product line variants, the computer program product comprising:
   a non-transitory computer-readable storage medium; and
   computer-readable program code embodied in said non-transitory computer-readable storage medium, wherein said computer-readable program code is configured to:
      construct a model of a plurality of variants of a computer software application, wherein said model includes:
         at least one common-to-variants element that is common to a plurality of said variants;
         a plurality of variant-specific elements, wherein said plurality of variant-specific elements include at least one place-holder class having a first variant-related stereotype and a plurality of dependency associations associating said place-holder class with a plurality of variant classes having a second variant-related stereotype that is different than said first variant-related stereotype, wherein programming logic for each of said plurality of variant-specific elements is provided with each of said plurality of said variants of a variation point; and
      interface code configured to conform any of said variant-specific elements to any of said common-to-variants elements; and
   generate a plurality of computer software applications for a corresponding plurality of combinations of said common-to-variants elements and said variant-specific elements, wherein said plurality of computer software applications are generated from a single model.

* * * * *